Aug. 23, 1932.  D. W. DAVISSON ET AL  1,873,189
LUBRICATOR
Filed Jan. 22, 1930
FIG.1
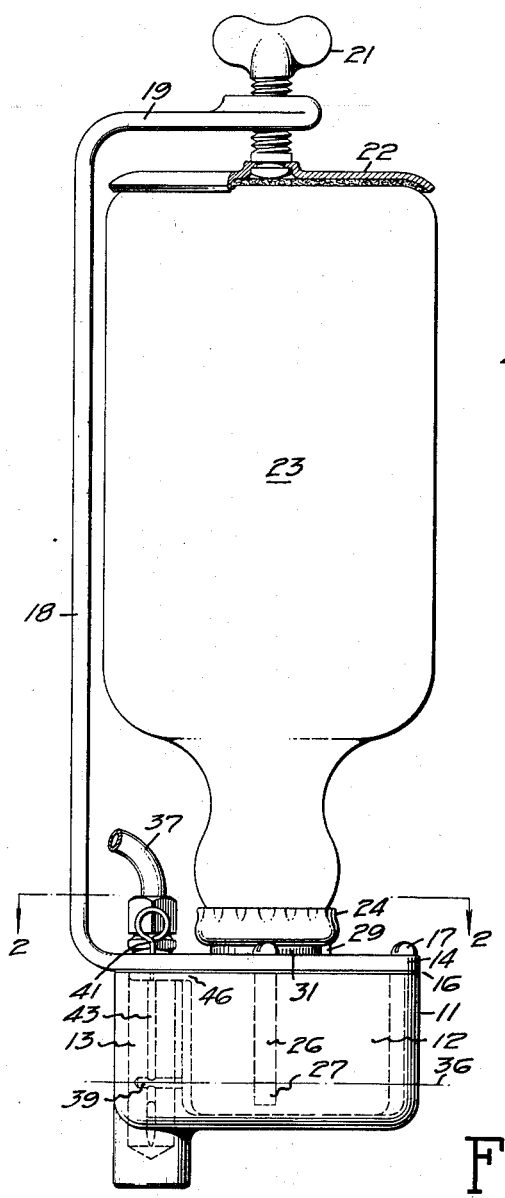
FIG.2
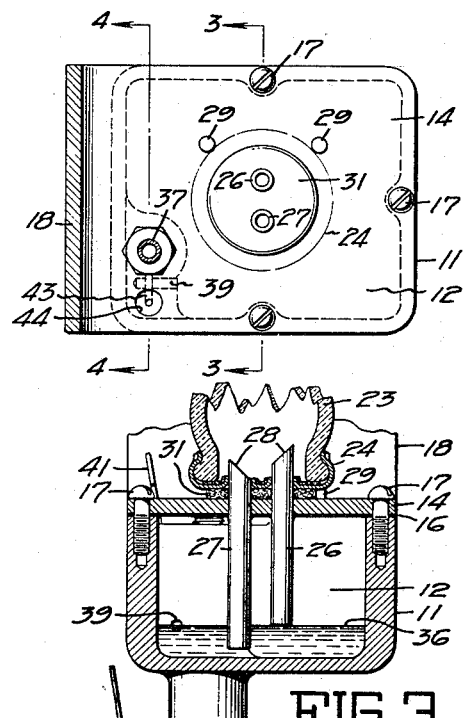
FIG.3
FIG.4
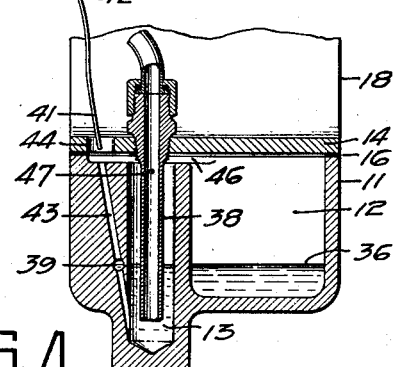
INVENTORS.
Delos W. Davisson
Ferdinand G. Welke
BY
ATTORNEY.

Patented Aug. 23, 1932

1,873,189

UNITED STATES PATENT OFFICE

DELOS W. DAVISSON AND FERDINAND G. WELKE, OF SAN FRANCISCO, CALIFORNIA, ASSIGNORS TO SHELL DEVELOPMENT COMPANY, OF SAN FRANCISCO, CALIFORNIA, A CORPORATION OF DELAWARE

LUBRICATOR

Application filed January 22, 1930. Serial No. 422,554.

This invention relates to a device for supplying a lubricant to the upper portion of a cylinder in a gas engine, as in an automobile.

It is the general object of the invention to devise a lubricator of a relatively simple, inexpensive and novel form.

It is a further object of the invention to devise a lubricator in which the supply of lubricant is readily and conveniently replenished.

The invention possesses other advantageous features and objects, some of which, with the foregoing will be set forth in the following specification in which we have outlined the preferred form of the lubricator of our invention which we have chosen for illustration in the drawing accompanying and forming part of the present specification. It is to be understood that the invention, as defined by the claims, is to be accorded a range of equivalents consistent with the state of the prior art.

In the drawing, to which reference has been made above, Figure 1 is a side elevational view of the lubricator of our invention ready for attachment to a gas engine.

Figure 2 is a cross sectional view on the line 2—2 of Figure 1, the view illustrating the body proper of the lubricator.

Figure 3 is a cross section on the line 3—3 of Figure 2, showing the attachment of the oil container to the body.

Figure 4 is a cross section on the line 4—4 of the device shown in Figure 2, the view illustrating the manner of constructing the body of the lubricator to supply lubricant in the advantageous manner attained in accordance with our invention.

It has been ascertained, as a practical observation, that the sticking of valves in a gas engine is substantially obviated by supplying a lubricant to the explosion chamber of the cylinders so that the upper portions of the cylinders and the valves are lubricated. The introduction of the lubricant is conveniently accomplished by supplying it to the intake manifold to be carried by the vaporized fuel and so supplied to the cylinder. In the form of lubricator which we have here shown, a body 11 is hollowed out to provide several cavities constituting an oil reservoir 12 and an oil chamber 13. The cavities in the body are covered over by a cover plate 14, a gasket 16 being interposed between them and secured by screws 17 extending through the cover plate into the body. For convenience and simplicity in construction, the cover plate 14 preferably continues to form a bracket 18, capable of being attached to the engine or device as an automobile of which the engine may be a part, and an arm 19, extending parallel to the cover plate and spaced from it a predetermined distance in the same vertical plane. A bolt 21 is threaded through the arm 19 and carries a plate 22 formed to engage and retain a suitable oil container as glass bottle 23. The plate 22 and bolt 21 are preferably freely movable relatively to facilitate positioning of the bottle, the plate, however, being secured to the bolt to prevent its loss.

Upon automotive devices it is a consideration that the supply of lubricant be available in a convenient form so that it may be readily inspected and replenished when necessary. A form of container which we have found very successful is supplied by the glass bottle 23 which, by its very nature, is readily inspected to ascertain the quantity of oil in it and very conveniently supplied and marketed. The bottle is closed by an ordinary frictionally engaged cap 24 sealed upon the bottle. The bottle containing oil may be filled, capped and sold for use with the lubricator as a separate article of commerce.

The provision of the bottle 23 to furnish a supply of lubricant is preferably accomplished, in accordance with our invention, by providing the cap 24 of a puncturable nature and by including means upon the body 11 to puncture the cap and to convey oil therefrom into the body. Such means are conveniently embodied by air tube 26 and oil tube 27 extending through the cover plate 14 and having end portions 28 sharpened to pierce the puncturable cap on the bottle. As is shown in Figures 1 and 3, the bottle is positioned upon the lubricator and, upon screwing down the bolt 21, the sharpened end portions 28 are forced through the puncturable cap 24, the cap being guided into position by guide pins 29 to rest upon a sealing washer 31 provided between the cap and the cover plate 14. It is to be noted that the tube 27 extends down into the oil reservoir 12 to a greater distance than does the tube 26. This is to provide for the passage of oil from the container into the reservoir through the oil tube 27 and for air to pass into the container to replace the oil through the air tube 26.

It is also to be noted that the reservoir 12 is of a considerable extent. This is to accommodate for expansion of the oil and air within the container 23 when the lubricator becomes heated up upon operation of the engine. If the lubricator is positioned underneath the hood of an automobile, considerable expansion will be attendant upon the operation of the motor, particularly upon a hot day. By providing the reservoir 12 of considerable extent, the uniform operation of the device is cared for since the expansion of the oil and vapor is accommodated.

The oil passing from the tube 27 into the oil reservoir establishes a level indicated at 36, when the engine is not running, in both the reservoir and in the oil chamber 13. Upon operation of the motor and creation of a suction in the intake manifold, oil is withdrawn from the lubricator to be supplied to the motor with the initial charge of fuel. In the embodiment here disclosed this is provided for by a pipe 37 which extends to the intake manifold (not shown) from oil suction pipe 38 threaded into the cover plate. The pipe 38 extends into the well for some distance below the normally established oil level 36. Accordingly, when the suction is applied through the pipe 37, the oil level will be drawn down in the chamber 13 to the end of the pipe, thus furnishing a considerable quantity of oil to the cylinders during starting. This is particularly important, since surfaces within the cylinder are then relatively unlubricated, depending upon how long a period and under what conditions the motor has been standing idle. As the oil is drawn out of the chamber 13, the supply is maintained through passage 39 extending from the reservoir 12 into the oil chamber 13. Control of the quantity of oil admitted to the chamber 13 is effected by inserting a wire 41 to partially obstruct the passage 39 to secure the desired oil quantity admission. The wire is preferably bent as at 42 to retain it in position within the passage. Insertion of the wire is facilitated by drilling a hole 43 angularly through the body to continue a portion of the passage 39 and extend it to the exterior of the body so that the wire may be inserted. The cover plate is provided with an aperture 44 so that the wire may be conveniently positioned and adjusted. Since the lubricant employed ordinarily contains an ingredient which tends to gum or solidify, particularly if the lubricator is not used, the wire also serves to provide a means for cleaning out the passage 39 to free it of any accumulated gum or residue. Admission of air to the oil reservoir and to the container 23 is secured by forming a passageway 46 between the cover plate and the body so that the oil reservoir, the oil well and the container are substantially under atmospheric pressure.

When the motor is not running, the siphoning of oil out of the chamber 13 over into the intake manifold is prevented by drilling a small vent hole 47 in the pipe 38 above the oil level so that air is admitted to the pipe. The hole is relatively small so that suction of the motor is not rendered ineffective to withdraw oil.

When the container 23 is empty the bolt 21 may be unscrewed to release the container and a new container positioned and provided upon the tubes 26 and 27 to furnish a supply of oil.

It is to be remarked that a material simplification has been effected in upper cylinder lubricators and that advantageous features have been incorporated not possessed by lubricators heretofore.

We claim:

1. An upper cylinder lubricator comprising a body having a chamber adapted to be supplied with oil, a vacuum line for withdrawing oil from the chamber, an oil container separable from the body, a puncturable cap on the container, two conduits on the body with means for puncturing the cap, one of said conduits extending into the chamber further than the other conduit.

2. An upper cylinder lubricator comprising a primary oil reservoir chamber, a secondary oil receiver chamber positioned below the primary chamber, a tertiary oil chamber of substantially reduced size in fluid communication with said secondary chamber and a vacuum line extending into said tertiary chamber to withdraw oil therefrom.

3. An upper cylinder lubricator comprising a primary oil reservoir chamber, a secondary chamber positioned below the primary chamber, means to maintain a constant level of oil in said secondary chamber, a tertiary chamber fed through valved means from said secondary chamber and a vacuum line extending to the bottom of said tertiary chamber.

4. An upper cylinder lubricator having a primary oil reservoir chamber positioned to feed oil by gravity to a secondary chamber, means to maintain a constant level of oil in said secondary chamber, a tertiary chamber in fluid communication therewith and adapted to contain a relative small amount of oil, a vacuum line extending into said tertiary chamber.

In testimony whereof, we have hereunto set our hands.

DELOS W. DAVISSON.
FERDINAND G. WELKE.